United States Patent [19]

Christensen et al.

[11] Patent Number: 4,821,125

[45] Date of Patent: Apr. 11, 1989

[54] COMPENSATION OF WRITE CURRENT AND DELTA-V FOR RECORDING COMPONENT AND RADIAL POSITION

[75] Inventors: Thomas C. Christensen; Jonathan D. Coker; Earl A. Cunningham; Richard C. Jaworski; Gregory J. Kerwin; Dean C. Palmer, all of Rochester; Jeffrey R. Roepke, Byron, all of Minn.

[73] Assignee: International Business Machines Corporation, Armonk, N.Y.

[21] Appl. No.: 872,793

[22] Filed: Jun. 11, 1986

[51] Int. Cl.$^4$ ........................ G11B 27/36; G11B 5/09
[52] U.S. Cl. ........................ 360/31; 360/25; 360/46; 369/53
[58] Field of Search .............. 360/25, 31, 39, 46, 360/53, 65; 324/210; 369/53; 371/25

[56] References Cited

U.S. PATENT DOCUMENTS

| | | | |
|---|---|---|---|
| 3,947,875 | 3/1976 | Bull et al. | 360/25 |
| 4,251,882 | 2/1981 | Pfefferkorn | 360/25 |
| 4,258,397 | 3/1981 | Kitamura et al. | 360/31 |
| 4,295,168 | 10/1981 | Müller | 360/31 |
| 4,399,474 | 8/1983 | Colemon, Jr. | 360/46 |
| 4,484,237 | 11/1984 | Muto | 360/65 |
| 4,564,869 | 1/1986 | Baumeister | 360/46 |
| 4,612,586 | 9/1986 | Sordello et al. | 360/31 |
| 4,633,336 | 12/1986 | Horie et al. | 360/45 |
| 4,635,142 | 1/1987 | Haugland | 360/46 |

Primary Examiner—Alan Faber
Assistant Examiner—Surinder Sachar
Attorney, Agent, or Firm—Robert W. Lahtinen

[57] ABSTRACT

A magnetic disk drive channel circuitry is shown and described that generates eight incremental values of write current and eight incremental values of delta-V (the minimum voltage change per unit time which tests signals to discriminate between data and noise). Each of these variable parameter values may be program selected by a three bit bus signal. This variability testing of an adaptation to the optimum parameter value for each head media combination and by grouping tracks in contiguous data bands, the parameters may be optimized for tracks near the inner diameter, the outer diameter and in the middle band. The variable delta-V can also be used as an additional data recovery tool wherein re-reading with a lower value enhances recovery of missing bit errors and re-reading with an increased value can assist recovery from an extra bit error.

31 Claims, 6 Drawing Sheets

COMPENSATION OF WRITE CURRENT AND DELTA-V FOR RECORDING COMPONENT AND RADIAL POSITION

FIELD OF THE INVENTION

This invention pertains to rotating memory and more particularly to circuitry for processing serial data in a magnetic disk drive system.

BACKGROUND OF THE INVENTION

Two aspects of data storage devices are under constant pressure for enhancement. One is the continuing effort to increase storage density and the other is the continuing development work directed to the reduction of response time by higher speed components or improved techniques.

Storage density is increased by increasing bit densities and by narrower, more closely spaced data tracks. These changes result in a reduction of the size of the bit domains which requires that the reading and writing capabilities be upgraded to higher levels of performance to maintain the same standard of reliability previously attained.

Among the characteristics that are designed to optimize drive performance are the write current supplied to the transducer during the write operating mode and during the reading mode, the delta-V, which is the voltage change per unit time threshold which is used to discriminate between data and noise signals on the channel. It has been common practice to set both of these values to obtain optimum performance. However, with both of these parameters, the value that obtain best performance varies from transducer to transducer and also with the radial position of transducer location which is a function of the speed of the head relative to the media surface. Another problem that arises is the phenomena that components that test as being within the product specification can fail to function properly in combination with other components, while components that appear to fail with respect to specification standards, may function properly in combination with other components.

SUMMARY OF THE INVENTION

In the disk drive channel circuitry of the present invention, provision is made to vary the write current and the Delta-V (the minimum voltage change per unit time which tests data to discriminate between data and noise). This is done to improve the general performance of the drive and to adapt these factors on a transducer head by transducer head basis. This procedure also accommodates the system to the peculiarities of the various components.

As shown in the illustrated embodiment, both the write currents and the delta-V thresholds are provided in eight amplitudes and the tracks are arranged in three contiguous bands on each data surface. During the write operation, an operating sequence is used to optimize the write current at a given track location. This current accommodates the radial position of the track, the head characteristics, and recording channel components. In addition to optimizing the write current for the head, the number of errors experienced during performance of the optimization technique provides a close correlation with the overall performance of the device. There is no direct measurement of overall performance that can be made since there are many unmeasurable parameters that affect such performance.

The current is then varied for each of the bands of tracks to provide adjustment across the radius of data tracks to accommodate the varying speed and transducer head fly height which is greater at the outside diameter and lower at the inside diameter. The greater fly height requires a larger write current than when the air bearing gap is reduced at the lower velocity and fly height of the inside diameter.

When data is read from the tracks, the amplitude of the signal or delta-V threshold recognized as data is varied to improve overall performance. A higher delta-V value can be required at the outer data band with higher tangential speed than at the inner data band where lower velocity results in lower resolution. In the normal disk drive environment, multiple disks with data surfaces on each side are used with at least one head per data surface. It is common to have 16 heads in a drive with 4 disks and two heads per surface or an 8 disk drive with a single head per surface. Under such conditions the variable write current and delta-V also adapt to each of the 16 combinations of a specific head, channel circuit and disk media data surface.

Another factor in the overall performance of a disk file is the data recovery procedure that enables the tolerance of an increased number of soft errors as the bit domains and read signal amplitudes diminish and it is necessary to maintain the same standard of hard error occurrence. The variable delta-V enables another data recovery tool to be added to the recovery sequence. After the correction of errors in the data stream that are transparent to the system and impose no delay, it is the most common procedure to re-read the data and thereafter again re-read with several increments of head shift in each direction. Thereafter, re-reads can be conducted using various incremented values of delta-V prior to the various more complex error correction codes. This affords another vehicle for increasing storage system capabilities.

DETAILED DESCRIPTION

Figure 1:
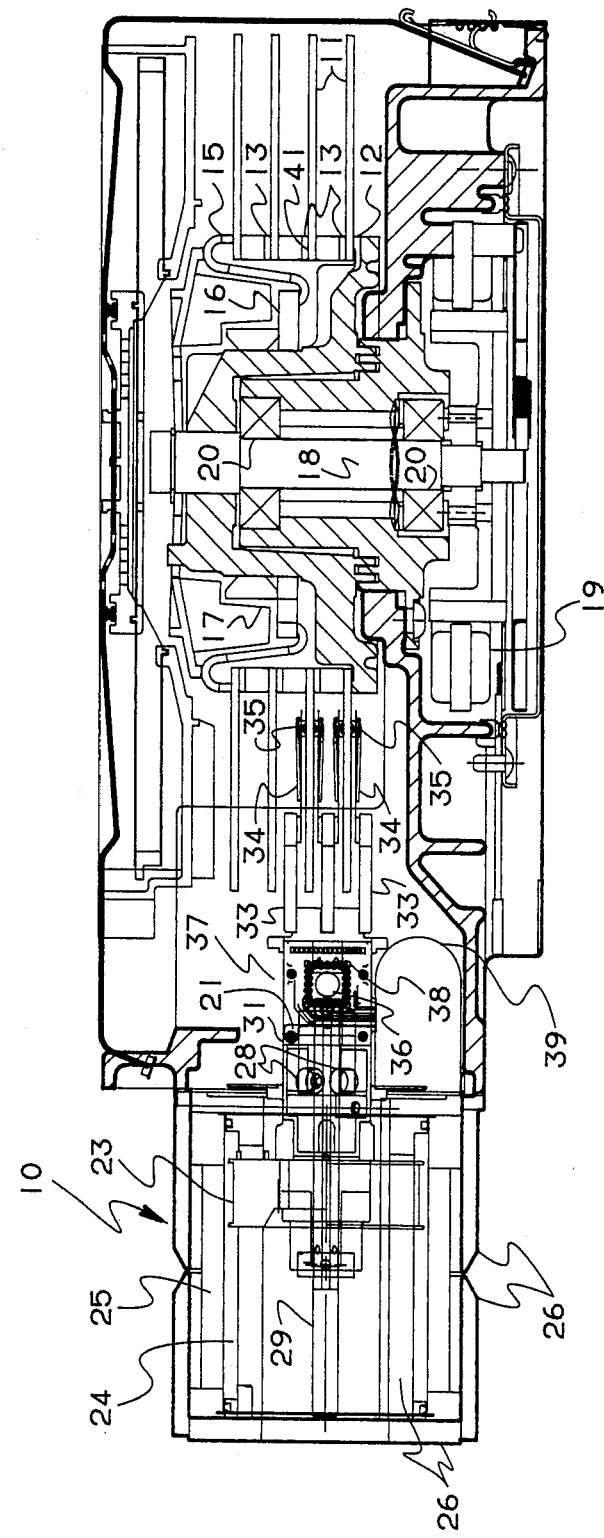
FIG. 1 is a vertical section of a typical magnetic disk storage device illustrating the principal mechanical elements.

FIG. 1 illustrates a typical magnetic disk drive wherein the actuator assembly 10 accesses the lower two disks 11 of a four disk spindle drive assembly. The hub 12 has four disks mounted thereon which are separated by spacers 13. The disk stack is compressively retained on hub 12 by a resilient element 15, collar 16 and the shrink ring 17 that is secured against the outer surface of the hub 12 by a shrink fit after assembly when heated and expanded. The hub/disk assembly is mounted on spindle shaft 18 such that the disks 11, hub 12, spindle shaft 18 and the rotor of the spindle drive motor 19 rotate in unison with the support of bearings 20.

The linear actuator carriage 21 is driven by a voice coil wound on the bobbin 23 to effect radial inward and outward motion. The voice coil reciprocates in the working air gap 24 in which a magnetic field is established by the radially polarized permanent magnets 25 and the pole pieces 26. Actuator carriage 21 is guided along the radial path by three pairs of rollers 28 (one pair of which is shown) that engage a rod or way 29 at each lateral side of the actuator carriage. Two pairs of longitudinally spaced rollers are at one side and one pair at the other lateral side is disposed longitudinally intermediate the other two pairs. One roller of the single pair is spring biased to take up any play or slack in the mechanical system between the carriage/roller assembly and the ways or rails 29.

The carriage assembly includes the body 31 which carries rollers 28; the voice coil and transducer suspension assemblies wherein arm 33 has attached thereto a resilient suspension 34 that carries a transducer head 35. Each of the transducer coils is attached to the arm electronics module 36 on the flexible conductor 37 at the solder terminations 38. The arm electronics module 36 is connected o the remainder of the disk drive circuitry by conductors on the flat cable portion 39. There is also an internal air circulation within the head disk assembly which is induced by the impeller action of the hub 12 and the rotating disks 11. Air flows radially outward from the hub interior through apertures 41 in the spacers 13.

Figure 2:
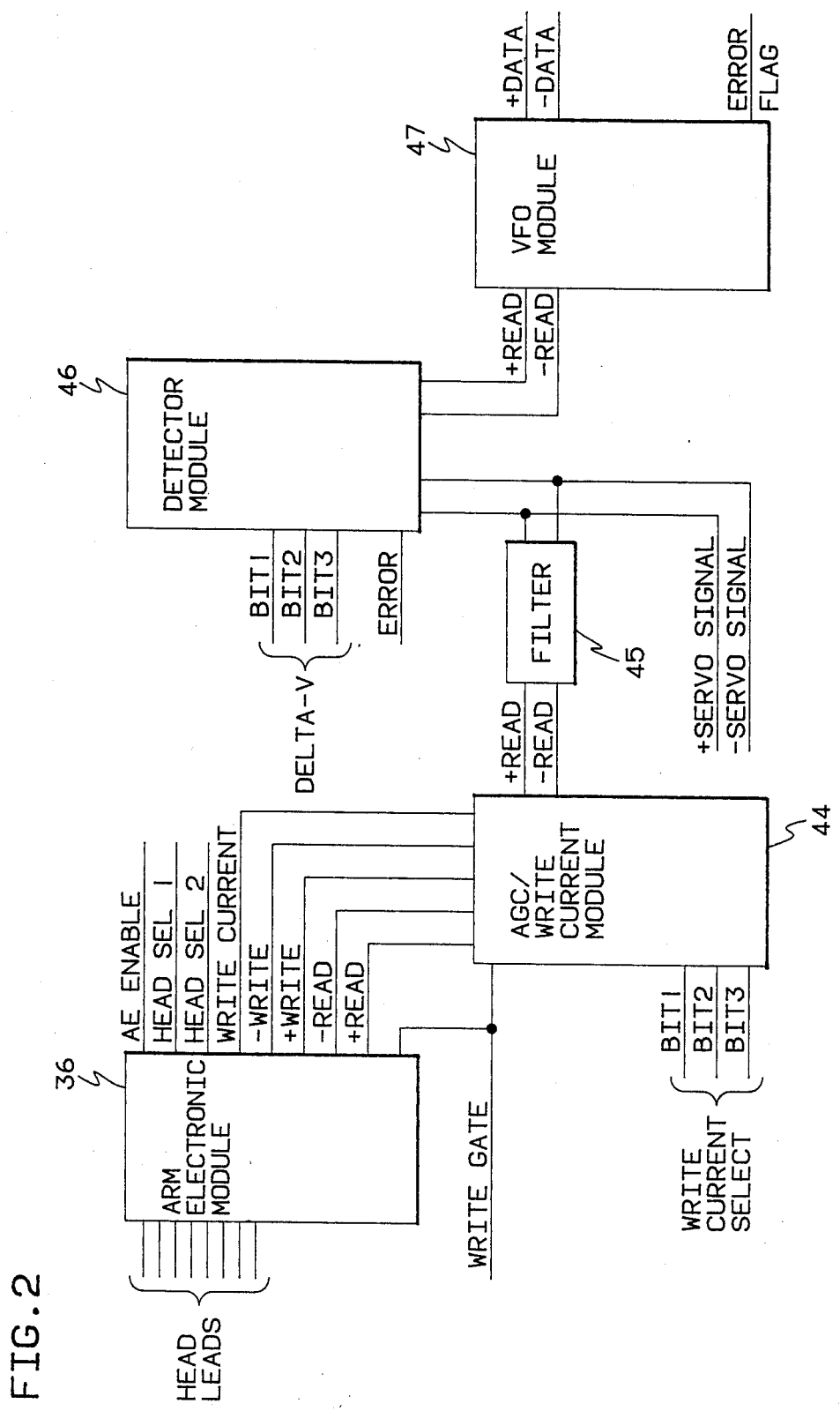
FIG. 2 s a schematic block diagram of the electronic modules associated with the disk drive data channel and the read and write operating modes.

FIG. 2 is a simplified block diagram illustrating the disk drive circuit modules associated with the data channel and the read/write signals transmitted to and received from the transducer heads. The arm electronics (AE) module is usually carried on the actuator as shown in FIG. 1. The AE module provides four basic functions; read mode operation, write mode operation, select control line operation and safety and diagnostic circuitry operation. In read mode, the AE module 36 provides the initial high gain amplification of the head signal voltage. In write mode, the AE module causes reversals of the write current in one of the four heads it services thus allowing the alternating magnetization of the disk surface that constitute the encoded data bits. Driver stages steer the write current into alternate sides of the center tapped ferrite transducer head. In addition to the read and write modes of operation, the AE module can also be deselected. This mode is provided primarily for data integrity or safety. If the module were inadvertently in the write mode, deselecting the module would remove the condition. The AE module is also used to assure reliability which is achieved by monitoring and reporting conditions that have the potential of destroying recorded data. Besides monitoring the status of select and write circuitry within the module, the safety function also monitors the integrity of the recording head and control line attached to it.

As with the AE module 36, the AGC module 44 provides read, write and safety functions. When the channel is in the read mode, AGC module 44 receives the amplified head signal from AE module 36. This signal is then amplified, held to a constant amplitude and sent through a filter 45 to the detector module 46. Two basic write operations are provided by AGC module 44, the write trigger and the write current source. Write data from encoder circuitry is received, converted into a differential divide by two signal and then driven down the flex cable to the write pre-driver stage in AE module 36. The other write function is the current source which can be programmed by three bits (write current select bits 1, 2 and 3) to generate eight discrete values. This capability affords a means to compensate for other recording component tolerances. Since AGC module 44 contains write mode circuitry, safety circuitry has been incorporated to assure data integrity should these circuits malfunction by monitoring the internal AGC module write circuitry, insuring proper operation of the write current select line and checking fault conditions detected by monitoring the differential read signal lines.

The detector module 46 contains only read mode functions with the sole purpose being to transform the amplified linear head signal into a corresponding series of digital pulses. All waveform peaks are detected and a series of peak filtering circuits are employed to find the resultant valid data peaks. Two key criteria are applied to all the peaks identified by the differentiation, delta-V and "V threshold". The circuitry responsible for these two functions, along with some combinational logic, provide the discrimination between data and extraneous peaks necessary to pass a clean string of data pulses to VFO module 47. Provided within the detector module is the capability to externally select the values used for the detection algorithm. Eight levels of delta-V amplitude can be programmed using control lines, delta-V bits 1, 2 and 3.

Like detector module 46, VFO module 47 contains only read mode function. The function is to assign bit locations to the incoming data pulses and provide a read clock that is synchronous with the file spindle. The VFO is constantly comparing a string of pulses to its oscillator output. In the read mode the comparison pulse string is the read data. Adjustments are made to the oscillator frequency that are proportional to the the measured phase error of each compared pulse. The adjustment magnitude per sampled error or response time is determined by which of the two modes it is in. Prior to receiving actual data, the VFO receives a series of constant frequency pulses that make up the sync field. This field is written at the same time as the data and is used to prepare or set up the VFO to accept the actual data. When the sync field appears at the input of the VFO, the module is placed in the fast sync mode. During the time it is in this mode, the VFO reacts faster to maximize the oscillator adjustment per sampled phase error and therefore minimize the time it takes to lock the VFO to the data. For the remaining time the VFO is in the read mode. During the last part of the sync field and all through the data field, VFO response is slowed to provide optimum frequency compensation.

Figure 3:
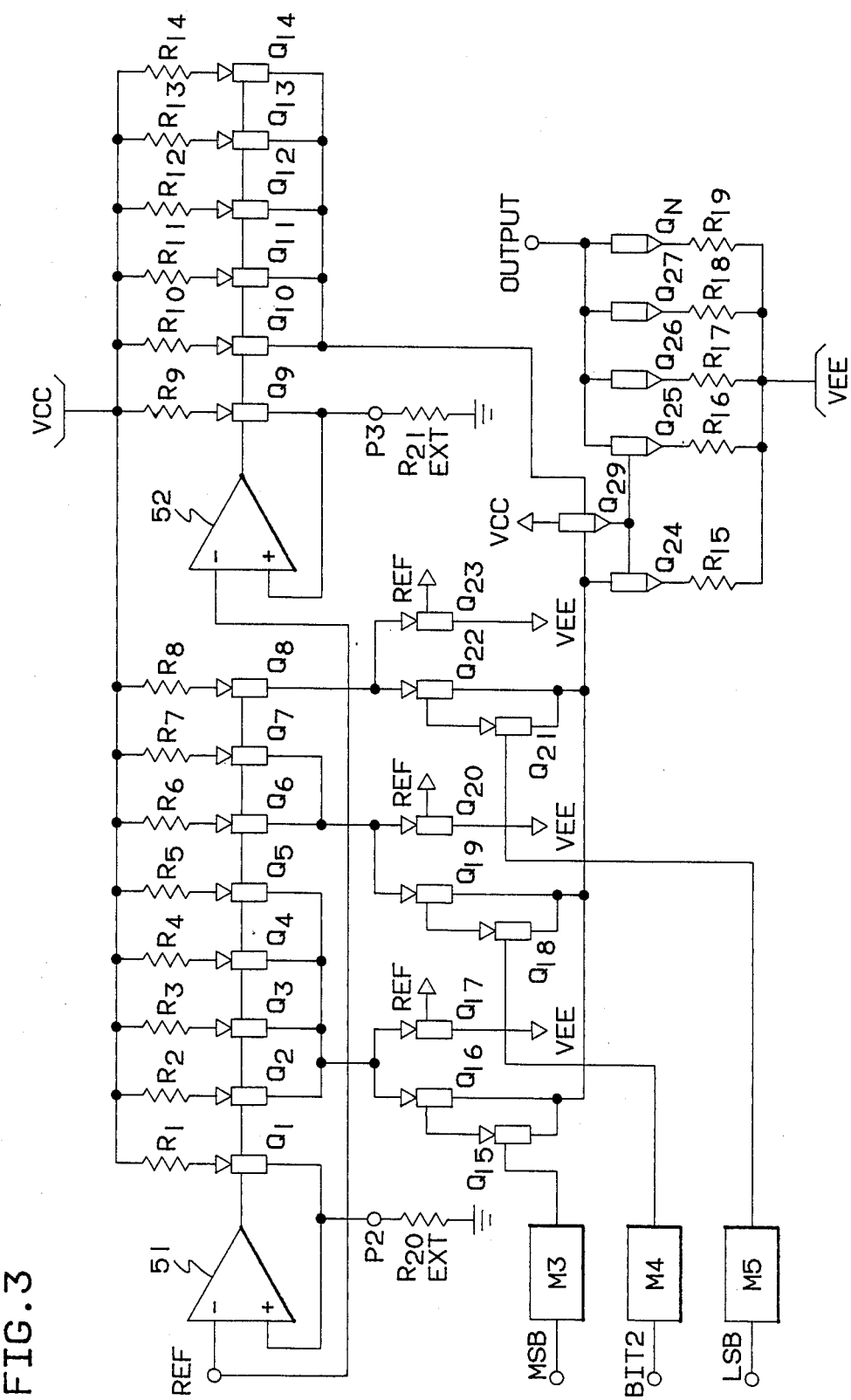
FIG. 3 is a diagram of the AGC module circuitry used to generate the variable write current.

The adjustable write current source, shown in FIG. 3, provides the capability to select any of eight different values of write current, such that the optimal value of write current is attained for a particular head/disk combination, at a particular radial location. Moreover, the selected current is within 5% of the specified value. This tolerance value is achieved without the use of costly active laser trimming. The current source further provides an accurate write current value by making use of a precision reference that is generated on the electronics card. The reference voltage is applied to the negative inputs of two operational amplifiers 51, 52 of the adjustable current source circuit as shown in FIG. 3.

Operational amplifier 52 forms a current source with transistor Q9 and resistor R21. The reference voltage, which is maintained across R21 by the operational amplifier 52-transistor Q9 loop, sets the current in transistor Q9. This current is environmentally stable and is only a function of the 2.5% precision reference voltage and the 1% resistor tolerance. The current in transistor Q9 is then mirrored by transistors Q10 through Q14. This current, known as the base value of current, is five times the current in transistor Q9.

Operational amplifier 51 and transistor Q1 form another current source that is determined by resistor R20. This current, known as the step current, is mirrored by the transistors Q2 through Q8 to produce three binary weighted, environmentally stable currents. These three currents are switched by three differential switches formed using transistors Q15 through Q23, which are enabled by three receivers, M3, M4 and M5. Eight current levels are achievable through the possible combinations of the three binary weighted currents. The output of the three differential switches, along with the base value of current, are driven into the output mirror formed of transistors Q24 through QN. The output mirror multiplies the sum of the binary weighted current and the base level current by a large number to obtain the desired write current value.

Figure 4:
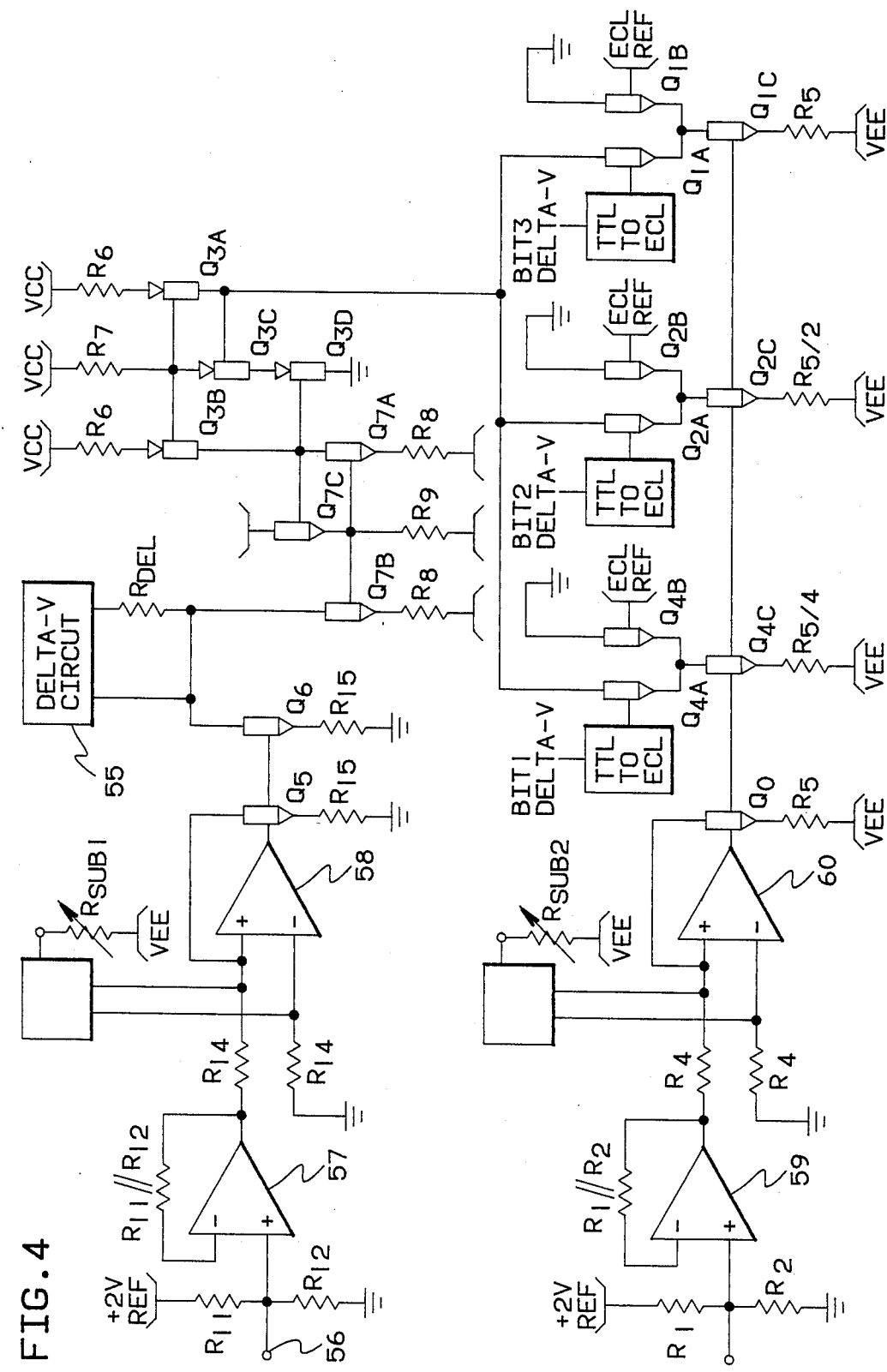
FIG. 4 is a diagram of the detector module circuitry used to generate the variable values of delta-V.

FIG. 4 shows a detailed block diagram of the circuit used for the adjustable delta-V parameter. The delta-V detector circuit is depicted as a block 55 that senses the voltage Vdel across the resistor Rdel. A 2 volt, 2.5% reference voltage is used to set up the delta-V voltage.

The delta-V voltage is broken up into two components, a base value and an increment value. The base delta-V voltage represents the minimum desired value of delta-V. The incremental delta-V represents an adder to the base delta-V voltage which can be dynamically altered via a three bit digital control bus. FIG. 4 shows the base voltage generated using resistors R11 and R12 to divide down the 2 volt reference. The voltage is brought to a module pin 56 so that it can be monitored or modified. Amplifier 57 buffers this base voltage and feeds it to a transconductance amplifier made up of amplifier 58, transistors Q5 and Q6 and resistors R14 and R15. The resulting current is dropped across resistor Rdel in the delta-V detector to produce the base delta-V voltage. The emitter areas of transistors Q5 and Q6 are identical and the device emitter resistors are identical, so transistors Q5 and Q6 carry identical collector currents. Since the ratio of resistor R14 to resistor Rdel is four to one, the voltage generated across Rdel is one fourth the voltage applied to the input of amplifier 58. This offset current is controlled by laser trimming a module substrate resistor Rsub1 while monitoring the voltage across resistor Rdel.

Incremental voltage is generated using resistors R1 and R2 to divide down the 2 volt reference. Amplifier 59 buffers this increment voltage and feeds it to a transconductance amplifier made up of amplifier 60; transistors Q0, Q4C, Q2C and Q1C and resistors R4, R5, R5/4 and R5/2. Because the relative emitter areas of transistors Q0, Q4C, Q2C and Q1C are 1, 4, 2 and 1 respectively and the inverse at the emitter resistances are in the same ratio; the collector currents of these devices scale in the same ratio as emitter area. A differential transducer pair above each of the transconductance amplifier current source transistors Q4C, Q2C and Q1C allows each of these currents to be turned on or off by a logic signal passed through a TTL to ECL converter. Since the currents are binary scaled 4, 2, 1 the combined current magnitude scales with the three bit binary number on the digital bus. The combined current in the collectors of transistors Q4A, Q2A and Q1A are mirrored by transistors Q3A, Q3B, Q3C, Q3D and resistors R6 and R7 and mirrored again by transistors Q7A, Q7B and Q7C and resistors R and R9 to be dropped across resistor Rdel. Since the ratio of resistor R4 to resistor Rdel is twenty to one, the voltage generated across Rdel for a binary one digital control input is one twentieth the voltage applied by the resistor divider of resistor R1 and R2. Up to seven increments in delta-V increment voltage can be obtained with an all ones binary input. The offset error of this circuit is nulled out by an offset current applied to the input of amplifier 60. This offset current is controlled by laser trimming a module substrate resistor Rsub2 while monitoring voltage across Rdel.

The availability of variable write current values and variable values for delta-V that can be set and reset on a head by head and track by track basis enables previously unavailable techniques for test and adjustment during manufacture to improve performance. This ability can be used to optimize all head-media combinations or, as is described hereafter, as a qualification test to bring poorer performing component combinations to an acceptable level and thereby increase manufacturing throughput by increasing the percentage of devices that meet required specifications of performance. The qualification test more accurately detects error performance of single components or of single files. More accurate test data improves yield by allowing tighter component performance specifications, lowers cost by discarding fewer so called good components measured bad and improves the quality by detecting more of the bad components measured good. The test will detect poor error performance whether it results from poor signal to noise, adjacent track interference (squeeze) or other factors.

The following is a specific test and optimization sequence. To accommodate variations due to the distance of the head from the center of rotation which is reflected in a varying tangential speed and a variable fly height of the head, the data tracks are divided into three bands of contiguous tracks; an inner band of shortest radius, a middle band and an outer band. The inner band is most critical and consequently the tests and optimization techniques are conducted on tracks in the inner band with respect to both the write current and the delta-V. When the optimum value of write current or delta-V is established at the inner band test track or tracks, corresponding settings are made for the middle band and the outer band tracks. The values in the following tables are the 0 through 7 settings of the three bit signals which respectively select the write current or delta-V.

TABLE I

WRITE CURRENT SELECTIONS
FOR MIDDLE AND OUTER BANDS

| OPTIMUM VALUE AT INNER BAND | CORRESPONDING SETTINGS FOR | |
|---|---|---|
| | MIDDLE BAND | OUTER BAND |
| 6 | 7 | 7 |
| 5 | 6 | 7 |
| 4 | 5 | 6 |
| 3 | 4 | 5 |
| 2 | 3 | 4 |

TABLE I-continued
WRITE CURRENT SELECTIONS FOR MIDDLE AND OUTER BANDS

| OPTIMUM VALUE AT INNER BAND | CORRESPONDING SETTINGS FOR | |
|---|---|---|
| | MIDDLE BAND | OUTER BAND |
| 1 | 2 | 3 |
| 0 | 1 | 2 |

TABLE II
DELTA-V SELECTIONS FOR MIDDLE AND OUTER BANDS

| OPTIMUM VALUE AT INNER BAND | CORRESPONDING SETTINGS FOR | |
|---|---|---|
| | MIDDLE BAND | OUTER BAND |
| 5 | 6 | 7 |
| 4 | 5 | 7 |
| 3 | 4 | 6 |
| 2 | 3 | 5 |
| 1 | 2 | 4 |
| 0 | 1 | 3 |

Each of five tracks within the inner band which are separated by at least two intermediate tracks are written with test information. Old information, new information and squeeze information are respectively three patterns of information that are written and repeated to the full length of the data field on the track in the following manner:

| Pattern | Position |
|---|---|
| 1. Old information | on track +2 micron head shift |
| 2. Old information | on track −2 micron head shift |
| 3. New information | on track |
| 4. Squeeze information | on track + one track −1 micron head shift |
| 5. Squeeze information | on track − one track +1 micron head shift |

The write current test sequence follows with the step sequence repeated for each of the five tracks written with test information:
1. Write the information patterns as set out above. Use current write current.
2. Read the new information pattern 10 times, recording the number of failures for each sector. Use present delta-V.
3. Remove errors associated with the four worst sectors. Tally remaining errors.
4. Repeat steps 1, 2 and 3 twice for a total of three times.
5. Sum all errors tallied.

The following delta-V test sequence is performed and repeated for each of the tracks written with test information:
1. Read the new information pattern 30 times, recording the number of failures for each sector. Use present delta-V.
2. Remove the errors associated with the four worst sectors on each track. Tally remaining errors.

In either of the above test sequences, if the total error count is zero, then increment the error count to 1. This will prevent possible division by zero errors in the control algorithm.

Figure 5:
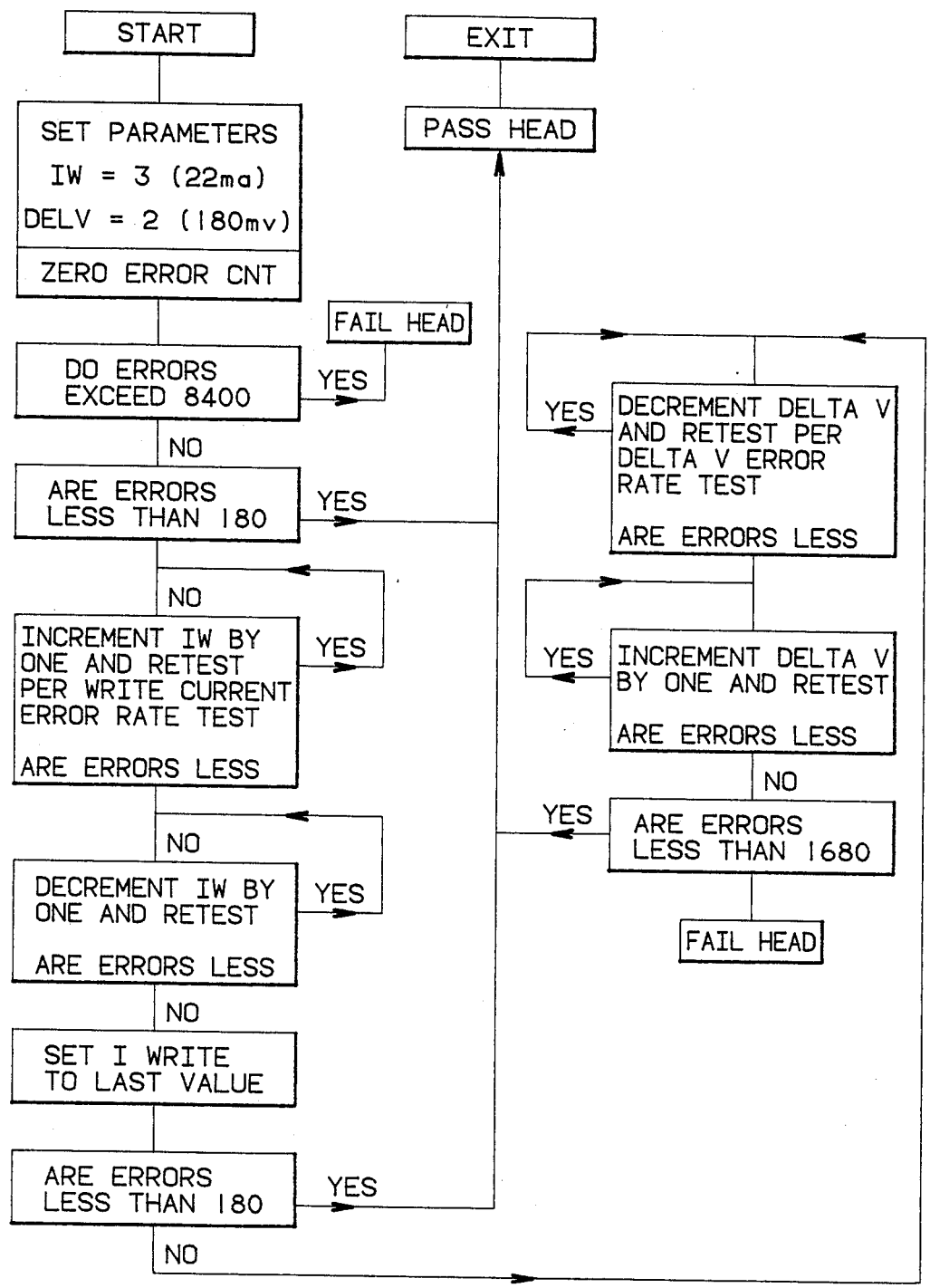
FIG. 5 is a flow chart showing the procedure for optimizing the variable write current and the variable delta-V values.

FIG. 5 illustrates the control technique and sequence for optimizing the values of write current and delta-V. The sequence will always optimize write current, provided the head fails the initial cut. Delta-V is optimized only if the write current optimization does not improve the head beyond the required specification.

The test is initiated using initial settings of write current and delta-V. If the error sum during the first write current test sequence exceeds a specified high value, the head is immediately failed and if the error sum is below a second predetermined sum, the head is immediately passed as satisfactory without further test. If neither of these conditions occurs, the write current is incremented and the head retested until the number of errors do not show a reduction from the previous test sequence. The write current is then decremented and the test sequence rerun until the error count fails to decrease. The current for the head is then set to the last value and if the last error count is less than the second predetermined sum, the head is passed and the test sequence terminated.

If the head does not meet the specification at the end of the write current optimization test sequence, the delta-V is decremented, the delta-V test sequence run and the steps repeated until the number of errors tallied is not less than the prior sequence. The delta-V is then incremented, the test sequence run and the steps repeated until the error sum fails to decrease with respect to the next previous test sequence. The number of errors at the optimized value of delta-V is compared to a third predetermined number indicative of a head-media combination that meets specification and if the error count exceeds such number the head is failed and if less than such number the head is passed as meeting the required specification.

The ability to vary a significant read mode parameter is also used as an effective tool in the data correction and recovery procedure. The processing of serial data read from the storage media includes an initial error identification and correction procedure that is capable of identifying error conditions and making modest corrections without interrupting the data flow and is therefore transparent to the using system.

The more complex error conditions require that the data recovery procedure be invoked. This is a many step procedure that is pursued until the error is corrected and the procedure thereupon terminated or continued through the entire routine of procedures to identify a hard, unrecoverable error. Although current devices are highly reliable and it is seldom necessary to utilize the data recovery procedures, satisfactory performance is dependent upon the capability of the device to recover from and correct the occasional errors without the errors becoming "hard", unrecoverable failures to read the data. It is also important that the device be capable of recovering data through its own capabilities without the ultimate factory intervention to recover vital user data.

Use of the variable delta-V adds a further tool or capability to the data recovery arsenal. Employing a variable delta-V detection parameter in conjunction with a re-read operation as a portion of the data recovery procedure is aimed at complementing the other data recovery procedure steps to enable it to be most effective and efficient. Various steps of the data recovery procedure are aimed at recovering from either time shifted or amplitude errors. The delta-V step is another technique directed to recovery from amplitude errors.

Figure 6:
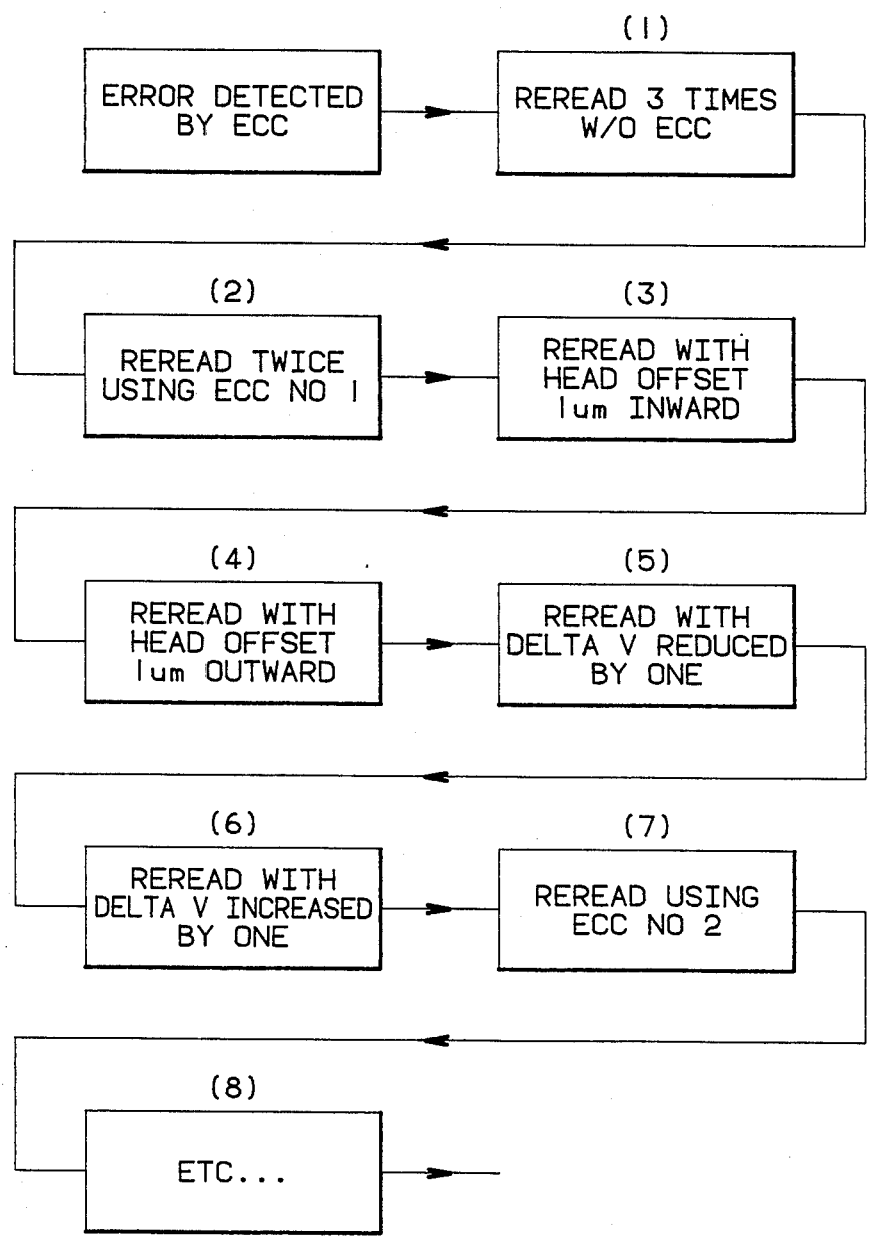
FIG. 6 is a flow chart illustrating a data recovery procedure including re-reads with increased and decreased values of delta-V.

The flow chart of FIG. 6 depicts the steps of the data recovery procedure through the re-read with increased delta-V and re-read with decreased delta-V steps. Upon detection of an error through a miscompare of the freshly calculated error correction code (ECC) value to that written with the data, the data recovery procedure is initiated. The steps of the recovery procedure are normally arranged to become progressively more complex, often requiring more time and usually possessing more error recovery power. The initial procedure is to simply re-read the data a number of times, which may overcome a random error condition such as noise that may not be present during a succeeding cycle. The next procedure would commonly be the use of a re-read with a double burst ECC followed by re-read steps during which the head is shifted first in one radial direction and then in the other radial direction. If the ECC values continue to miscompare, a re-read is done with the programmable delta-V value lowered to recover from a possible missing bit error. Next a re-read is conducted with the delta-V value raised to recover from a possible extra bit error. If recovery has not been accomplished, the procedure is continued until all steps have been taken. Only after the entire procedure has been executed is the error termed and reported as a hard error.

Accurate test capability of a single transducer head near component design limits is important. Good and bad components may be sorted more accurately. Test specifications may be set closer to design limitations. This means less excess test specification margin is necessary with the more accurate test. The prior poorer test to actual performance correlation meant additional test margin was necessary. Now with tighter correlation, the margin may be decreased and the resultant quality of the population of produced product will not be affected. At the same time yield or capacity of the product can improve, lowering cost or increasing competitiveness of the device or both.

The actual test is similar to tests performed on precision test stands during file development. First, two bands of old information are written by offsetting the head position and writing a data pattern in each radial direction from the nominal position. Then the data pattern (normally another random pattern) is written in the nominal on-track position. Then the head is accessed to the next track and offset back toward the data track and a third random pattern is written. This is termed a squeeze track. Another squeeze pattern is also written on the opposite side. The error rate of the data track is then measured from the on track position. The read is then repeated on the same track for better statistics, and the writing and reading is repeated on three other tracks representing each of the four types of servo tracks for a sector servo implementation or adjacent tracks for a dedicated servo application so that a representative average of error performance is achieved. For a typical drive this procedure takes only a short time, since it is not necessary to measure the actual error rate of very good heads, but only marginal heads. Allowed raw error rates may be significantly higher since the ECC and automatic recovery significantly improves the apparent error rate.

For narrow heads, the squeeze track would be some distance away from the data track, and will cause few detrimental effects in normal file operation. The head is therefore tested with the same type of interference as seen in normal file operation. For wide heads, the squeeze track will partially protrude into the edge of the data track, partially erasing data and writing additional interference much as in normal file operation. Writing the squeeze track closer to the data track simulates a much more rare track misregistration than occurs in normal file operation. This allows testing of the failure mechanism in a short amount of test time. The wide heads are tested with stressful squeezes from adjacent tracks with normal signal to noise conditions. This proves to be a reasonable test for heads, since the heads that are normal or good in signal to noise performance can withstand more squeeze interference. A poor quality, poor efficiency head within the width specification may fail while a head which may be too wide, but of good efficiency could be passed. Thus the test measures the actual performance of a file in contrast to imposing a somewhat arbitrary maximum track width.

Most magnetic transducer head tests have a loose correlation to file performance. Compromises in specifications are made which cloud whether the components are acceptable or not. Many unmeasurable component parameters can affect the error rate while not correspondingly affecting the ability of the head to pass a magnetic amplitude test. The use of an error rate test allows testing of head or disk components with the data transferring channel used in the product. Thus, although small factors may not be identified as influencing the performance in a magnetic transducer head test, their effect is directly included in the error rate measurement. Therefore a more accurate prediction of file performance is achieved than is possible with an amplitude measurement system.

The actual file error rate differs somewhat from tested head error rates due to several factors. One factor is that the magnetic error rate test is performed using a standard disk. In the file, the disk used will be different and may perform differently. Another difference is that the noise level in a file may differ slightly from one to the next, causing some differences in equivalent head performances. In an actual device environment, the file may have a throughput specification which dictates the average file error rate. The average file error rate depends on the variation of error rate between components on each of the surfaces and across each of the surfaces of the total file. For near worst case components, the variation due to the performance ramp with radius does not differ much from the estimates done using single cylinder test data. This is because the inner radii in many files dominate the error rate. Overall projections based on the error rate at the inner radius can be fairly accurate. No head test is absolutely accurate in projecting file performance, but the magnetic error rate test is more accurate and less arbitrary than previous tests.

What is claimed is:

1. In a rotating magnetic disk storage device which uses a magnetic transducer head to write data to and read data from a moving magnetic media surface having parallel data tracks thereon and has plural selectable values of write current, the method of enhancing transducer head read-write performance comprising:

writing a predetermined pattern of information on a selected track using an initial value of write current which comprises the steps of, writing old information on the selected track, writing new information on the selected track, and writing another information pattern on each track adjoining said selected track with each adjacent track information pattern offset toward said selected track;

reading the data on said selected track and recording the number of errors;

incrementing said write current within said plurality of selectable values, reading data on said selected track and recording the number of errors; and if the number of errors is fewer than the number recorded after the next previous reading, repeating the prior step of incrementing the write current and reading the selected track and if the number of errors exceeds the next previous recorded error count, setting the write current at the next prior write current value.

2. The method of enhancing transducer head performance of claim 1 wherein said selected track comprises a plurality of tracks, each written with said predetermined pattern and each read during said reading steps.

3. The method of enhancing transducer head performance of claim 2 wherein said storage device is a magnetic disk drive and all tracks addressed by a single transducer head on a single disk surface are divided into a plurality of bands of contiguous tracks and all of said plurality of selected tracks are within a single band.

4. The method of enhancing transducer head performance of claim 3 wherein said single band is the band of tracks having the smallest radius.

5. The method of enhancing transducer head performance of claim 4 further comprising selecting a write current value for said single transducer head to be used in bands other than said inner band based on the optimized value for said inner band and a predetermined set of values for other bands.

6. A rotating data storage device wherein data is stored in parallel tracks on data storage media having a plurality of data storage surfaces and using a magnetic transducer head with each data surface, a data channel including circuitry wherein a write current is provided to the coil of the magnetic transducer head to write or record data on a data storage surface which comprises:

means for generating a plurality of write current values including circuit means for respectively generating said plurality of values in response to the value of a signal received by said circuit means;

means for selecting an optimum one of said plurality of write current values at a given radial location of each magnetic transducer head, which selected value may vary from transducer head to transducer head; and means for selecting other values of said plurality of values of write current at other radial positions of each of said magnetic transducer heads, whereby the write current may be varied radially with respect to each of said magnetic transducer heads independently of each of the other transducer heads.

7. The rotating magnetic storage device of claim 6 wherein each of said plurality of write current values includes a base value of current plus an incremental step current value that varies in accordance with the signal received by said circuit means.

8. The rotating magnetic data storage device of claim 7 wherein one of said incremental step current values is zero.

9. The rotating magnetic storage device of claim 7 wherein said parallel tracks are divided into a plurality of contiguous bands of tracks and each said band uses a write current value that can vary from band to band.

10. The rotating magnetic storage device of claim 9 wherein the write current value is optimized for one band of tracks on each media surface and selected for the other bands of tracks on the media surface based on the optimized value for said one band and a predetermined set of values selected from said plurality of write current values for other bands of tracks on the same surface.

11. The rotating magnetic storage device of claim 10 wherein the optimum one of said write current values is selected for the innermost band of tracks on a disk surface and the write current value for other bands of tracks of greater radius is selected in accordance with a predetermined sequence of values based on said optimum write current value used with the tracks of said inner band.

12. The rotating magnetic data storage device of claim 7 wherein said signal is received on a bus providing binary signals to produce binary increments of write current.

13. The rotating magnetic data storage device of claim 12 wherein said bus is a three bit bus with said current means generating binary write current increments whereby the write current has a base value of current value when all bus lines are off and uniform additive increments of 1 through 7 units in accordance with the binary signal on said bus when one or more lines are active.

14. A data storage device wherein the data is stored in parallel tracks on a data storage media having a plurality of data storage surfaces, with at least one transducer head associated with each data storage surface, comprising:

a data channel including circuitry wherein a serial data read signal is verified for a true peak by determining that the read signal voltage has a minimum change during a given time (delta-V);

means for generating a plurality of delta-V values including circuit means for respectively selecting one of said plurality of values in response to the value of a signal received by said circuit means;

means for using an optimum one of said plurality of values of delta-V to verify a read signal read from a data surface track with each of said heads at a given radial position, which optimum value can vary from head to head; and means for selecting other of said plurality of delta-V values with respect to each of said heads at other radial positions of said heads.

15. The data storage device of claim 14 wherein each of said plurality of values of delta-V includes a base value plus an incremental value that varies in accordance with said signal received by said circuit means.

16. The data storage device of claim 15 wherein one of said incremental values is zero.

17. The data storage device of claim 15 wherein said parallel tracks are divided into a plurality of contiguous bands of tracks and each said band uses a value of delta-V that can vary from band to band.

18. The data storage device of claim 17 wherein the selected delta-V value is optimized for one band of tracks on each media surface and selected for the other bands of tracks on the media surfaces based on the optimized value for said one band on that surface and a predetermined set of values for said other bands of tracks on the same surface.

19. The data storage device of claim 18 wherein the selected delta-V value is optimized for the innermost band of tracks on a disk surface and the delta-V value for other bands of tracks of greater radius is selected in accordance with a predetermined sequence of values based on said optimized value of said inner band.

20. The data storage device of claim 15 wherein said signal is received on a bus which provides binary signals to produce binary increments of delta-V.

21. The data storage device of claim 20 wherein said bus is a three bit bus with said circuit means generating binary increments of delta-V whereby delta-V has a base value when all bus lines are off and uniform added increments of 1 through 7 units in accordance with the binary signal on said bus when one or more lines are active.

22. In a rotating magnetic data storage device which uses a magnetic transducer head to write data to and read data from a moving magnetic media surface having parallel data tracks thereon and has plural selectable values of write current and uses a signal change per unit time (delta-V) read signal peak verification having a plurality of selectable values of delta-V, the method of enhancing transducer head read-write performance comprising
  writing a predetermined pattern of information on a selected track;
  reading the data on said selected track using an initial value of write current and recording the number of errors;
  incrementing said write current within said plurality of selectable values, reading data on said selected track and recording the number of errors;
  if the number of errors is fewer than the number recorded after the next previous reading, repeating the prior step of incrementing the write current and reading the selected track or if the present write current value is the final incremental value, setting the write current at the present value and if the number of errors exceeds the next previous recorded error count, setting the write current at the next prior write current value;
  reading said selected track and recording the number of delta-V errors;
  decrement delta-V and reread said selected track, recording the number of delta-v errors;
  if errors are less, repeat last step and if errors are more, increment delta-v, reread said selected track and record the number of delta-V errors;
  if errors are less than the previous sum, repeat step of incrementing delta-V and rereading;
  when retest produces an increased error sum, set delta-V at immediately preceding value or at the final value if fewer errors and current value is the final incremental value.

23. The method of enhancing transducer head performance of claim 22 wherein the step of writing a predetermined pattern of information on a selected track comprises the steps of,
  writing old information on the selected track,
  writing new information on the selected track, and
  writing another information pattern on each track adjoining said selected track with each adjacent track information pattern offset toward said selected track.

24. The method of enhancing transducer head performance of claim 23 wherein said steps of reading and rereading said selected track comprises reading said track a predetermined number of times.

25. The method of enhancing transducer head performance of claim 24 wherein
  if the number of errors recorded after the first reading of said selected track exceeds a first pre-established number, the transducer head is failed and the test is terminated and
  if the number of errors recorded at the final write current value setting is not less than a second pre-established number, the test is continued using successive decremented and incremented values of delta-V.

26. The method of enhancing transducer head performance of claim 25 wherein if the number of delta-V errors at the final incremental value is less than a third pre-established number, the head is passed as within specification and if the number of errors exceeds said third pre-established number, the head is failed.

27. In a rotating data storage device wherein data is written on and read from parallel tracks on a data disk storage media by a transducer, said device having means for reading and re-reading selected data tracks and means for shifting said transducer from the data track centerline position and using a data channel including circuitry wherein the serial data read signal is verified for a true peak by determining that the read signal voltage has a minimum change during a given time (delta-V) with means for altering the value of delta-V, an error recovery procedure invoked following identification of an error not correctable during real time processing of the serial data stream comprising
  re-reading the track on which the error occurred;
  shifting the transducer in one radial direction and re-reading said track;
  shifting the transducer in the opposite of said one radial direction and re-reading said track; and
  re-reading said track using an incremented value of delta-V.

28. The error recovery procedure of claim 27 wherein said re-reading with an incremented value of delta-V includes the steps of:
  incrementing the value of delta-V and re-reading said track and
  decrementing the value of delta-V and re-reading said track.

29. The error recovery procedure of claim 28 wherein said step of re-reading the track on which the error occurred comprises a plurality of successive re-readings of said track.

30. The error recovery procedure of claim 29 wherein the steps including shifting of the transducer include plural increments of transducer shift in each radial direction and re-reading of said track at each shifted transducer position.

31. The error recovery procedure of claim 30 wherein the data recovery steps are sequentially invoked and the recovery procedure is terminated at the end of any step during which the detected error condition has been corrected.

* * * * *